United States Patent
Huffman

(10) Patent No.: US 7,694,026 B2
(45) Date of Patent: Apr. 6, 2010

(54) METHODS AND ARRANGEMENTS TO HANDLE NON-QUEUED COMMANDS FOR DATA STORAGE DEVICES

(75) Inventor: Amber D. Huffman, Banks, OR (US)

(73) Assignee: Intel Corporation, Santa Clara, CA (US)

( * ) Notice: Subject to any disclaimer, the term of this patent is extended or adjusted under 35 U.S.C. 154(b) by 37 days.

(21) Appl. No.: 11/394,880

(22) Filed: Mar. 31, 2006

(65) Prior Publication Data

US 2008/0005398 A1 Jan. 3, 2008

(51) Int. Cl.
*G06F 3/00* (2006.01)

(52) U.S. Cl. .............................. 710/5; 710/54; 710/59; 712/244

(58) Field of Classification Search .................. 710/54, 710/59, 5
See application file for complete search history.

(56) References Cited

U.S. PATENT DOCUMENTS

| | | | | |
|---|---|---|---|---|
| 5,313,612 | A * | 5/1994 | Satoh et al. .................. 711/162 |
| 5,333,138 | A * | 7/1994 | Richards et al. ............... 360/75 |
| 5,923,487 | A * | 7/1999 | Carlson et al. ................ 360/60 |
| 6,046,877 | A * | 4/2000 | Kelsic .......................... 360/75 |
| 6,311,256 | B2 * | 10/2001 | Halligan et al. ............. 711/158 |
| 6,600,614 | B2 * | 7/2003 | Lenny et al. .................. 360/31 |
| 2004/0068388 | A1 * | 4/2004 | Smith et al. .................. 702/150 |
| 2004/0073719 | A1 * | 4/2004 | Grimsrud et al. ............... 710/1 |

OTHER PUBLICATIONS

John L. Hennessy and David A. Patterson, Computer Architecture—A Quantiative Approach, 2003, Morgan Kaufmann Publishers, Third Edition, pp. A-38-A41.*

Intel Corporation and Seagate Technology, Serial ATA Native Command Queuing: An Exciting New Perfomance Feature for Serial ATA, Jul. 2003, pp. 2-4.*

* cited by examiner

*Primary Examiner*—Henry W. H. Tsai
*Assistant Examiner*—Elias Mamo
(74) *Attorney, Agent, or Firm*—Schubert Osterrieder & Nickelson PLLC; Garland Charpiot

(57) ABSTRACT

Methods and arrangements to handle non-queued commands for data storage devices, such as Parallel and Serial ATA hard drives, are disclosed. Embodiments may comprise a host and/or a data storage device. The host and data storage device may form, e.g., a handheld device such as an MP3 player, a cellular phone, or the like. The storage device may comprise a new method of responding to a non-queued command while the storage device may be processing a queue of commands. In many embodiments, the method involves processing queued commands until the drive receives a non-queued command that requires immediate processing by the drive. In many of these embodiments, the drive will respond in a new manner to process the non-queued command, the end result having no or minimal impact on host system operation.

22 Claims, 7 Drawing Sheets

METHODS AND ARRANGEMENTS TO HANDLE NON-QUEUED COMMANDS FOR DATA STORAGE DEVICES

FIELD

The present invention is in the field of data storage. More particularly, the present invention relates to methods and arrangements to handle non-queued commands for data storage devices, such as devices using Native Command Queuing for a Serial Advanced Technology Architecture (SATA) hard drive.

BACKGROUND

With each passing day consumers, business people, and manufacturers continually pressure computer and chip manufacturers to produce faster computer systems. Computer makers, to a great extent, have traditionally focused on improving processor designs and increasing processor throughput. Computer makers have also increased the speed and performance of chips that work in tandem with processors on a motherboard, such as input-output bridge chips. Additionally, they have improved motherboard bus systems as evidenced by higher speed buses and bus separation, such as separating the system bus from the input-output bus. The end result being that system performance bottlenecks have been reduced. One device that computer hardware manufacturers have improved, but which improvements pale in comparison to advancements made in purely electronic components, are computer hard disk drives and data storage devices.

Hard disks, as well as other data storage devices, remain critical bottlenecks in computer systems. One of the reasons for this stems from the nature of hard drives. Hard disks are electromechanical devices. When compared with other purely electronic devices, hard drives are slower by several orders of magnitude due to their mechanical nature. For example, while the performance or response time of a chip on the motherboard may be measured in microseconds or nanoseconds, hard drive performance parameters are generally measured in terms of milliseconds. Hard drive manufacturers have responded to consumer demands of faster data storage devices and improved the performance of such devices in a variety of different ways.

One technique hard drive manufacturers have employed is increasing the rotational speeds of the device platters. For example, hard drive manufacturers have increased the speeds of drives from 5400 rotations-per-minute (RPM) to 7200 RPM and 10,000 RPM. Additionally, they have increased the amount of hard drive cache memory to sizes that are now 8 and 16 megabytes (MB). Additionally, hard drive manufacturers are starting to employ command queuing techniques more and more often. One of the advantages of storing drive commands in a queue is the ability to improve the throughput of requests by reducing rotational and seek latencies associated with the requests. Another advantage of command queuing is the improvement of drive random input-output performance. Even so, existing queued command execution techniques have numerous limitations and undesirable side effects when a command that is outside the queue needs to be executed immediately, or ahead of the queued commands.

BRIEF DESCRIPTION OF THE DRAWINGS

Advantages of the invention will become apparent upon reading the following detailed description and upon reference to the accompanying drawings in which like references may indicate similar elements.

DETAILED DESCRIPTION OF EMBODIMENTS

Figure 1:
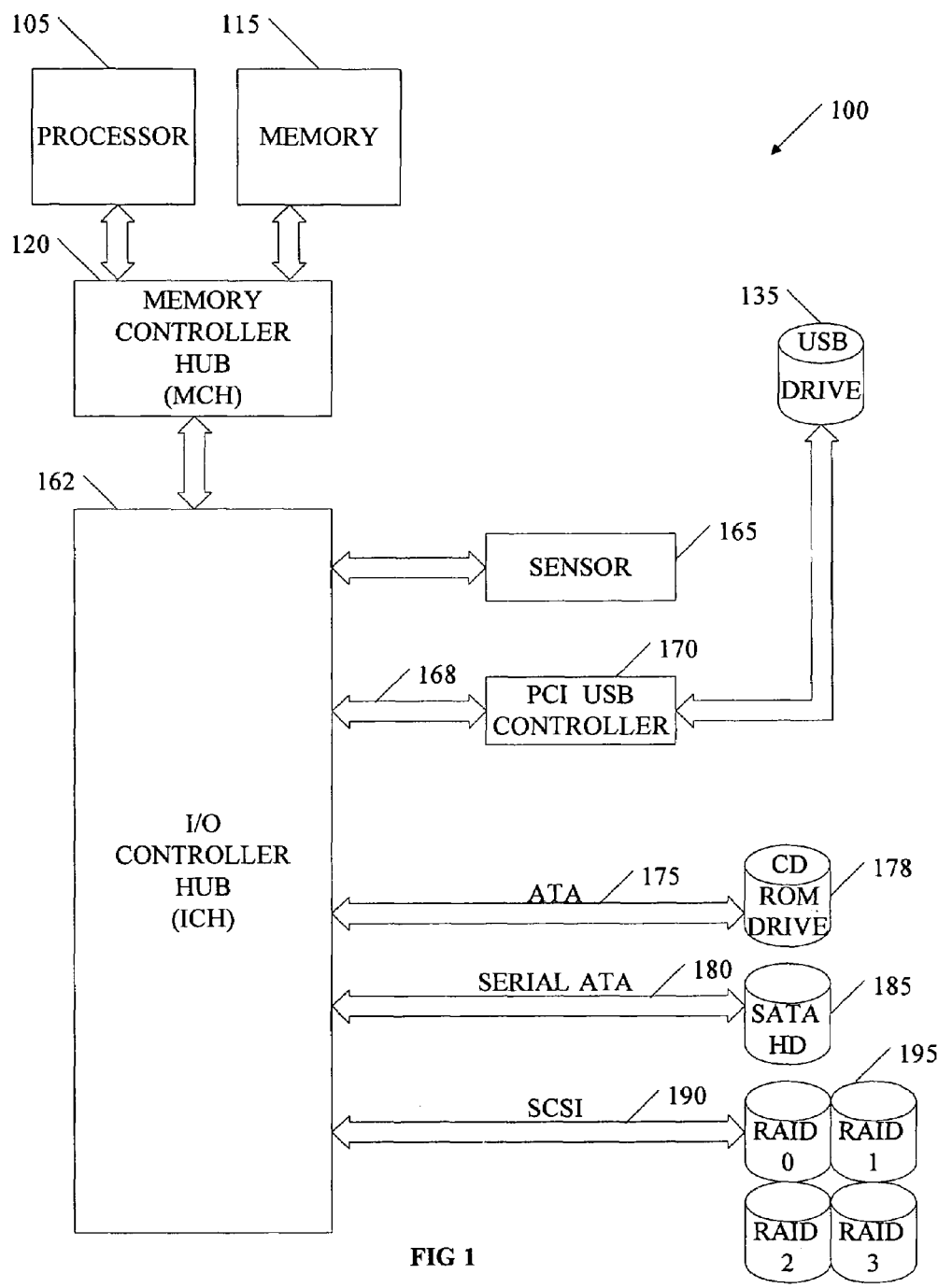
FIG. 1 depicts a computing system employing numerous data storage devices.

The following is a detailed description of embodiments of the invention depicted in the accompanying drawings. The embodiments are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods and arrangements to handle command queuing and non-queued commands for a data storage device, such as a Serial ATA hard drive, are contemplated. Embodiments generally comprise a host and a data storage device. The host and data storage device may form, e.g., a desktop computer, a computer workstation, a network server, as well as a handheld and/or portable computing device such as an MP3 or portable media player, a laptop or palm-held computer, or the like. The hard drive may employ a new method for handling queued and non-queued commands that may be transferred to the drive from the host. In many embodiments, the method involves processing queued commands until the drive receives a non-queued command that requires immediate processing by the drive. In several of these embodiments, the drive will respond in a new manner that satisfies the requirements for non-queued commands, yet fits within the existing command queuing protocol framework such that hardware changes may be unnecessary for either the host or the drive. To implement the enhanced functionality, software/firmware revisions may be the only changes necessary.

For example, after a non-queued command is received from the host, the drive may respond by indicating an error. However, in addition to indicating the error, the drive may also process the command in the background. When the host requests additional error information via a log page, the drive may report that the non-queued command was successfully completed. Since any queued commands may have been flushed upon receiving the non-queued command while one or more queued commands were being processed, the host may continue by re-issuing the flushed commands.

One may note that even storage devices employing the techniques described herein may also generally reject the majority of non-queued commands issued when queued commands are outstanding. There may be several reasons for processing the non-queued commands differently. First, having non-queued commands outstanding at the same time as queued commands may complicate the protocol substantially. To avoid this complicated protocol scenario, a host may normally wait until all queued commands are completed before issuing non-queued commands. Second, storage devices may have difficulty maintaining the ordering requirements within data commands. For example, if a host program were to issue a queued write and then a non-queued read for the same Logical Block Address (LBA), the data returned for the non-queued read should include information from the uncompleted queued write. Third, error handling may be difficult. For example, a storage device may experience a failure due to receiving a non-queued command while processing queued commands, but the drive may have trouble indicating which non-queued command caused the failure if the host can continue issuing non-queued commands. Overall, one may conclude that supporting non-queued commands when queued commands are outstanding may cause problems and thus not be ideal. However, some cases may warrant immediately processing a non-queued command, such as needing to immediately process a non-queued ULOAD command to protect hardware in a system.

In light of these aforementioned issues and requirements, some embodiments comprise issuing a non-queued IDLE IMMEDIATE command to a data storage device with an UNLOAD feature specified, while queued commands are outstanding. In many embodiments, the data storage device may respond by executing the specified command and feature, as well as transmitting initial status and error information back to the host system indicating that the command failed. The data storage device may transmit this initial error indication in response to receiving the non-queued command while the device was still processing queued commands. The host may learn whether the non-queued command was successfully completed from information contained in a subsequently transmitted error log page. Such embodiments may have the advantage of providing consistent hardware architectures for both the hosts and the drives. In other words, these embodiments may provide a technique for processing non-queued commands when they may otherwise be rejected by data storage devices, or processed without communicating status information back to the hosts, in a manner that is compatible with existing command queuing protocols.

In many cases, where storage device command processing is not time-critical, the usual method may be to wait for the outstanding commands to complete. However, when command processing is time-critical, higher level software of the hosts may utilize the techniques described herein to issue particular commands to the storage devices regardless of whether the devices are processing queued commands. Additionally, in various embodiments higher level software programs that issue particular service commands, such as the UNLOAD command, may not know whether queued commands are outstanding or not. Therefore, providing a framework or system where non-queued commands may be issued regardless of having uncompleted queued commands may prove extremely beneficial.

While portions of the following detailed discussion describe embodiments with reference to specific configurations and protocols, persons of ordinary skill in the art will recognize that embodiments may be implemented with other configurations and other protocols. Additionally, while some portions of the discussion describe ATA hard drives, such as Parallel ATA and Serial ATA drives, other embodiments may easily be implemented for other drive technologies, such as digital versatile disc (DVD) drives and compact disc (CD) drives.

Turning now to the drawings, FIG. 1 depicts a computing system 100 employing numerous data storage devices. Any and all of the data storage devices, also referred to as mass storage devices, in computing system 100 may employ methods and arrangements to handle queued and non-queued commands. Computing system 100 may comprise a processor 105. Processor 105 may be coupled to a memory controller hub (MCH) 120. Processor 105 may execute operating instructions, such as instructions of user applications, in memory 115 by interacting with MCH 120. For example, MCH 120 may interface with memory 115 to receive and send operators, operands, and processing results between processor 105 and memory 115. MCH 120 may also couple processor 105 with an input-output (I/O) controller hub (ICH) 162. ICH 162 may allow processor 105 to interact with external peripheral devices, such as keyboards, scanners, and data storage devices.

In different embodiments, processor 105, MCH 120, and memory 115 may operate at relatively fast operating speeds when compared to the operating speed of the individual data storage devices. Accordingly, each storage device may improve both computing system 100 performance and the performance of the storage device by employing a technique referred to as command queuing. For example, one or more data storage devices within computing system 100 may employ such command queuing methods as Tagged Command Queuing and Native Command Queuing. [See Information technology 13 AT Attachment Packet Interface-7 (ATA/ATAPI-7), 7 Feb. 2005 ] [See Also Serial ATA Revision 2.5, 27 Oct., 2005] [See Also SCSI-3 Primary Commands (SPC) (formally ANSI X3.301-1997) International Committee for Information Technology Standards (formerly NCITS), 1 Jan. 1997] By employing command queuing, a data storage device, such as a hard drive, may accept numerous commands, place them in one or more queues, and dynamically reorder outstanding commands before executing them to reduce both rotational and seek latencies.

In some embodiments, ICH 162 may allow processor 105 to store and retrieve data from a Universal Serial Bus (USB) drive 135 via a Peripheral Component Interconnect (PCI) USB controller 170 and USB bus 168. [See Universal Serial Bus Revision 2.0 specification, 21 Dec. 2000] [Also See PCI Local Bus Specification Revision 3.0, 3 Feb. 2004 ] For example, USB bus 168 may comprise a 33 MHz PCI bus coupled with a 480 megabits per second (Mbps) USB 2.0 PCI USB controller 170, sending commands to USB drive 135. In some embodiments, computing system 100 may comprise USB drive 135 employing command queuing for increased system performance. In other words, USB drive 135 may receive numerous commands, temporarily store them in a command queue, rearrange the command queue for increased execution efficiency, and execute the rearranged commands in the new order. Additionally, USB drive 135 may also receive a command from processor 105, sent via MCH 120 and ICH 162, which should be executed before any commands in the queue of USB drive 135. Such commands may be alternatively referred to as non-queued commands in the various embodiments.

In addition to USB drive 135, ICH 162 in computing system 100 may also control Advanced Technology Attachment (ATA) devices, such as ATA hard drives, CD drives, and DVD drives, that employ command queuing techniques. [See Information technology—AT Attachment Packet Interface-7 (ATA/ATAPI-7), 7 Feb. 2005, ] For example, ICH 162 may exchange information with a compact disc read only memory (CD ROM) drive 178 via a parallel Ultra ATA/100 bus 175. In alternative embodiments, parallel Ultra ATA/100 bus 175 may comprise another bus type, such as an Ultra ATA/133 IDE bus utilizing the ATA Packet Interface (ATAPI) protocol. Additionally, CD ROM drive 178 may vary in different embodiments. For example, in some embodiments CD ROM drive 178 may comprise a compact disc recordable (CD-R) drive, while in other embodiments it may comprise a CD rewritable (CD-RW) drive, a digital versatile disc (DVD) drive, a hard disk drive, or a tape drive. Information may be exchanged between the storage devices and other components in computing system 100, such as processor 105 and memory 115, using command queuing.

Similar to a parallel ATA bus and interface, computing system 100 may also have a Serial ATA (SATA) bus 180 which may couple a SATA drive, such as SATA hard drive 185, to ICH 162. [See Serial ATA Revision 2.5, 27 Oct. 2005] Also similar to the parallel ATA bus configuration, Serial ATA bus 180 may vary in bus operation speed and interface with numerous SATA devices. For example, in some embodiments Serial ATA bus 180 may comprise a 3.0 gigabit per second (Gbps) bus coupling SATA hard drive 185 to computing system 100 via ICH 162. In other embodiments, Serial ATA bus 180 may comprise a 1.5 Gbps SATA bus coupling a SATA DVD+/−RW drive to ICH 162.

SATA hard drive 185 may have Native Command Queuing (NCQ) enabled within its firmware. Additionally, SATA hard drive 185 may process transactional workloads and workloads within a multi-threading environment, such that processor 105 sends SATA hard drive 185 numerous commands, forming a queue of commands in memory of SATA hard drive 185. As a result, SATA hard drive 185 may constantly analyze the commands for optimized, or altered, execution sequence, and reorder them such that SATA hard drive 185 may process the commands in a different order than the order they were received. For example, the SATA hard drive 185 may reorder the execution sequence of the commands in the queue based upon the individual command LBAs, which corresponds to location of data, or information, within the storage medium. In various embodiments, the number of queued commands may vary. For example, in some embodiments that employ NCQ, the command queue depth may be 32 commands, whereas in embodiments that employ SCSI the queue depth may be up to 256 commands.

While computing system 100 is operating, SATA hard drive 185 may be executing, or processing, a number of commands in the queue. For example, SATA hard drive may be processing six read commands, such as Read First Party Direct Memory Address (FPDMA) Queued, and two write commands, such as Write FPDMA Queued. While processing the queued commands, processor 105 may issue another non-queued command that requires immediate processing. For example, computing system 100 may comprise a laptop computer with an accelerometer, or acceleration sensor 165 coupled to ICH 162. Such acceleration sensor 165 may detect when the laptop, computing system 100, is being dropped and about to experience an abrupt deceleration that may damage SATA hard drive 185. Accordingly, acceleration sensor 165 may cause ICH 162 to notify processor 105 of the impending incident, whereby processor 105 may respond by transmitting an "IDLE IMMEDIATE" command with an "UNLOAD" feature enabled. Once received and executed by SATA hard drive 185, the unload command may cause SATA hard drive 185 to retract one or more internal read-write heads away from one or more internal platters to protect them from damage.

Aside from parallel and serial ATA bus configurations, computing system 100 may also employ other storage device bus configurations, such as a Small Computer Systems Interface (SCSI) bus 190. Utilizing SCSI bus 190, ICH 162 may interface with various data storage devices, such as a Redundant Array of Independent Disks (RAID) system 195. In some embodiments, SCSI bus 190 may comprise a wide SCSI bus, such as a 68 pin-based bus, while in other embodiments SCSI bus 190 may comprise a narrow SCSI bus, such as a 50 pin-based bus. In even further embodiments, SCSI bus 190 may not be a SCSI bus but actually comprise a Serial ATA communication link coupled to RAID system 195. As with the other bus technologies and interfaces, devices connected to computing system 100 may also vary in communication speed, communication technology, and format. In other words, differing embodiments may employ different SCSI bus formats and technologies, such as synchronous and asynchronous communication methods, fast, wide, Ultra, Ultra 2, and Ultra 3 SCSI formats.

While the storage devices for example embodiments depicted in FIG. 1 are shown as USB, Parallel and Serial ATA, and SCSI devices, alternative embodiments may comprise storage devices employing other technologies. For example, some storage devices may couple to processor 105 via interface cards inserted in PCI Express® slots coupled to ICH 162. Alternatively, ICH 162 and processor 105 may transfer information to and from a FireWire® hard drive for data storage and retrieval. In further embodiments, processor 105 may issue commands to a Network Attached Storage (NAS) drive by way of an Ethernet controller coupled to ICH 162. That is to say, a FireWire® hard drive and/or a NAS drive may perform command queuing, receive a non-queued command, and properly handle the non-queued command.

While computing system 100 comprises a single processor 105, alternative embodiments may comprise dual or multiple processors, including one or more multi-core processors. Additionally, while computing system 100 may utilize a single acceleration sensor 165, alternative embodiments may utilize one or more alternative technology sensors, such as vibration sensors. Further embodiments may employ no sensors, but may experience certain operating conditions that require processor 105 to issue a non-queued command to a data storage device. Even further embodiments may have other devices coupled to computing system 100 sending non-queued commands to a data storage device, without involvement by processor 105.

Additionally, while computing system 100 may comprise a laptop computer with an acceleration sensor 165 to cause ICH 162 to notify processor 105 of the impending incident and causing processor 105 to respond by transmitting an "IDLE IMMEDIATE" command with an "UNLOAD" feature enabled, other embodiments may not have such a sensor. That is to say, some embodiments may sense another type of computing system 100 event and cause processor 105 to transmit another type of command to SATA hard drive 185, or another storage device. For example, computing system 100 may be coupled with a power sensor that detects or senses when power has been removed, or is in the process of being removed, from computing system 100. Such may be the case where a computing system 100 battery charge is low, or an uninterruptible power supply for computing system 100 has been activated and is supplying backup power to computing system 100. In such an alternative scenario, computing system 100 software and processor 105 may respond by transmitting a "FLUSH" command to SATA hard drive 185 to cause it to empty its dynamic random access memory (DRAM) to a storage medium of SATA hard drive 185.

Even more, while computing system 100 has numerous interface and bus technologies coupling different types of data storage devices to processor 105, alternative embodiments may have only single hard drives using single bus formats. Other embodiments may employ one or two different bus formats connecting only a few data storage devices to processor 105. Additionally, data storage devices may couple to computing system 100 with varying software register interfaces, such as an Advanced Host Controller Interface (AHCI), for example. [See Serial ATA Advanced Host Controller Interface (AHCI) Revision 1.1] The actual number of different storage device and bus configurations that may comprise different embodiments is almost limitless. All such configurations may benefit from the methods and arrangements to handle command queuing disclosed in the following figure discussions.

Figure 2:
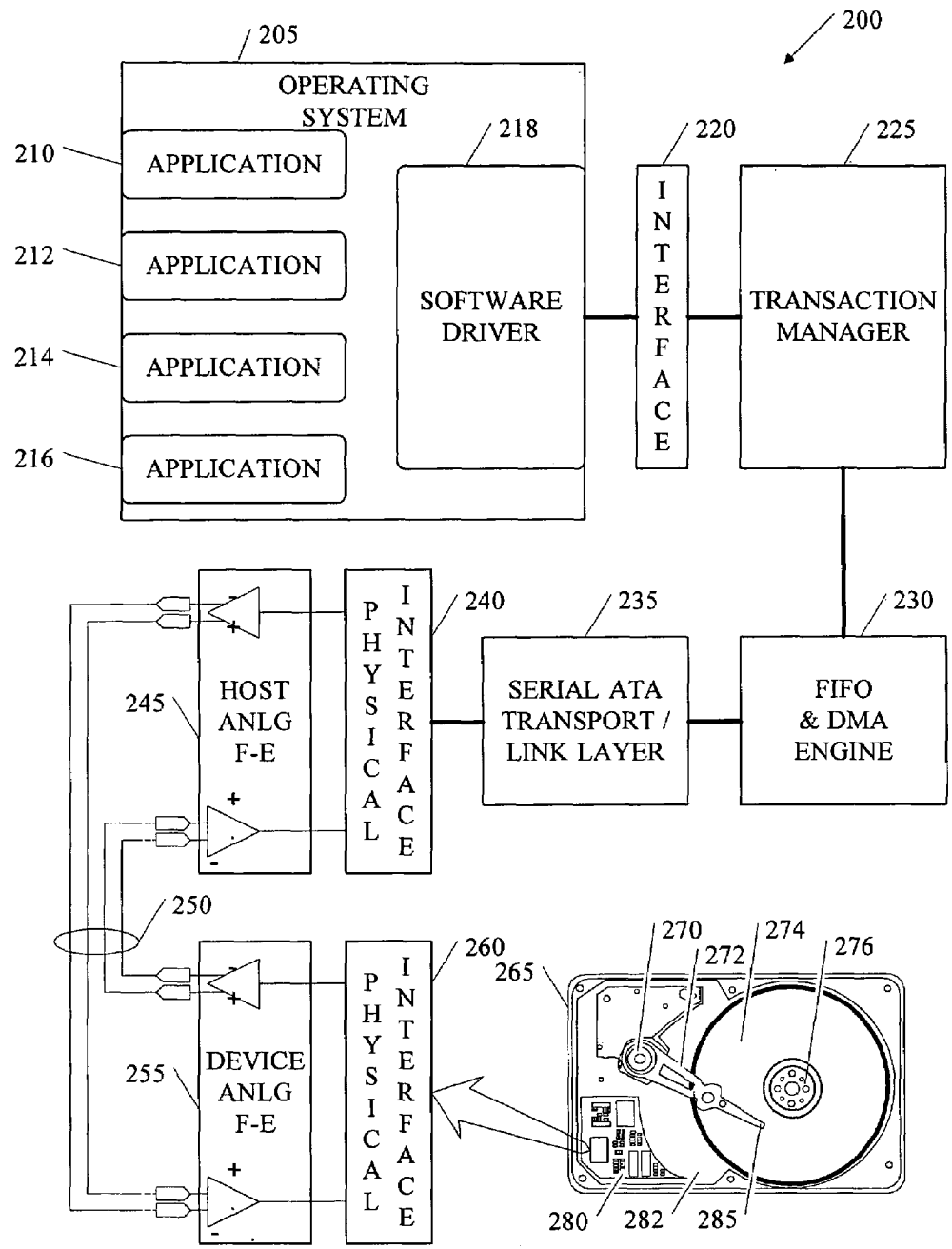
FIG. 2 depicts a computer system with an operating system running several applications, coupled to a Serial ATA hard drive.

In FIG. 2 there is shown an alternative embodiment of a computer system 200 having a Serial ATA drive 265. Computer system 200 has an operating system 205 running multiple applications, 210, 212, 214, and 216. Operating system 205 may be Windows®, Unix®, Linux®, Solaris®, Macintosh® OS X, or some other operating system. Applications 210, 212, 214, and 216 may comprise word processors, spreadsheet programs, database applications, web browsers, multimedia programs, or a variety of other applications that may be executing simultaneously under the control of operating system 205.

Operating system 205 may utilize a combination of software and hardware devices to send information to, and retrieve information from, Serial ATA drive 265. In the embodiment shown in FIG. 2, operating system 205 utilizes a software driver 218 to communicate with an interface 220. By way of example, interface 220 may comprise a PCI interface chip on a motherboard of computer system 200. Alternatively, interface 220 may comprise a section of a host bus adapter coupled with an AHCI interface of computer system 200.

Interface 220 may further interact with a transaction manager 225. Transaction manager 225 may comprise a multiplexing module, allowing operating system 205 to work with a number of devices for Serial ATA drives. One such device may be a first-in-first-out (FIFO) and direct memory access (DMA) engine 230, which transfers information for Serial ATA drive 265. FIFO & DMA engine 230 may acquire data from the operating system 205 and memory of computer system 200, store the data in a FIFO buffer, and transfer the data from the FIFO buffer to Serial ATA drive 265 using DMA functions. Conversely, FIFO & DMA engine 230 may perform similar operations in retrieving information stored in Serial ATA drive 265 and transferring the information to computer system 200 memory and operating system 205.

In sending information to Serial ATA drive 265, Serial ATA transport/link layer 235 may receive information from FIFO & DMA engine 230, construct a Frame Information Structure (FIS) based on the information, and present the FIS to the link layer so that it may be transmitted to physical interface 240. Conversely, in receiving information from Serial ATA drive 265 and transmitting it to operating system 205, Serial ATA transport/link layer 235 may receive an FIS from physical interface 240 and the link layer, determine the FIS type, and transmit the FIS content to FIFO & DMA engine 230 so that the content may be distributed to locations required by the FIS type. Additionally, Serial ATA transport/link layer 235 may also report good transmission results or transmission errors back to operating system 205.

Physical interface 240 may take the FIS content, convert it into serialized data, and work in conjunction with host analog front end 245 to transmit the content to device analog front end 255 over serial cable 250. Alternately, host analog front end 245 and physical interface 240 may receive serial data transmitted from device analog front end 255, reconstruct FIS content based on the transmitted analog signal, and transmit the FIS content to Serial ATA transport/link layer 235. Similar to the manner in which physical interface 240 and host analog front end 245 encode and decode serial information for the operating system 205 on the host side, device analog front end 255 and physical interface 260 may encode and decode serial information for Serial ATA drive 265.

While not shown for the sake of simplicity, an embodiment of computer system 200 may also have Serial ATA transport and link layers, as well as a FIFO buffer and DMA engine contained in, and performed by, an electronics controller board 280 of Serial ATA drive 265. Such control layers and electronics may serve to store and retrieve data from a storage medium in Serial ATA drive 265, similar to the fashion that data is stored and retrieved from memory for operating system 205. For example, after receiving and decoding data transmitted from operating system 205 in electronics controller board 280, such data may be stored in a storage medium of platter 274. Platter 274 may comprise a rigid circular magnetic media that is rotated at thousands of revolutions-per-minute around a center spindle 276.

Operating system 205 and Serial ATA drive 265 of FIG. 2 may employ a command queuing technique to improve the overall operation of computer system 200. Command queuing may be used by computer system 200, when operating system 205 is multi-threading or processing multi-threaded software. Since threads are generally designed to run in parallel, various commands may reach Serial ATA drive 265 simultaneously. To handle such multi-threading, computer system 200 and Serial ATA drive 265 may employ a form of command queuing known as Native Command Queuing (NCQ). [See Serial ATA Revision 2.5, 27 Oct. 2005] As referenced above, NCQ is a SATA command protocol allowing for increased drive performance. NCQ involves using algorithms to route hard disk heads in a more intelligent and efficient manner when numerous blocks of data need to be read or written. Stated differently, NCQ may allow Serial ATA drive 265 to reorder outstanding commands to reduce mechanical overhead and improve I/O latencies.

While operating system 205 and Serial ATA drive 265 of FIG. 2 may employ NCQ to improve the overall operation of computer system 200, computer system 200 may need to override the NCQ operation by issuing a priority or immediate command that needs to be processed before the remaining commands in the queue. For example, computer system 200 may comprise a laptop containing Serial ATA drive 265. A sensor within laptop computer system 200 may detect that the laptop is being dropped. Since read-write head 285 may be riding on a relatively thin layer of air above platter 274, leaving the head positioned above platter 274 may allow read-write head 285 to damage the surface of platter 274 upon laptop impact.

In response to sensing such a condition, operating system 205 may try to protect platter 274 from being damaged by immediately issuing a non-queued IDLE IMMEDIATE command with the UNLOAD feature specified, to Serial ATA drive 265. The operating system may be unaware of whether queued commands are outstanding but nonetheless consistently issue the non-queued UNLOAD command. If carried out immediately, the IDLE IMMEDIATE/UNLOAD command may cause Serial ATA drive 265 to activate an actuator and swing actuator arm 272 around actuator axis 270 until read-write head 285 and actuator arm 272 are positioned in a parking bay, or unloading spot 282, away from the surface of platter 274. Consequently, the data content stored within platter 274 may be protected.

However, since Serial ATA drive 265 may be processing a queue of commands and only expecting more queued commands, it may respond by initially reporting an error to operating system 205. When Serial ATA drive 265 is processing queued commands, operating system 205 may not normally issue any non-queued or legacy commands. [See Serial ATA Revision 2.5, 27 Oct. 2005] In other words, operating system 205 may not normally mix non-queued commands with queued commands while Serial ATA drive 265 is processing queued commands. Serial ATA drive 265 may signal the error condition to the operating system 205 upon receiving the non-queued command, abort any outstanding queued commands, and return Serial ATA drive 265 to a non-queued operating mode. Unless Serial ATA drive 265 is properly configured to both process the non-queued command and report whether it was successfully completed, operating system 205 may not know how to respond to the error and protect the data stored in Serial ATA drive 265. Accordingly, Serial ATA drive 265 may be configured to initially respond with an error, indicating the non-queued command failed, yet still attempt execution of the non-queued command. Serial ATA drive 265 may be further configured to communicate the actual completion status by setting one or more error and data bits in an error log page, transmitted to operating system 205 in response to a READ LOG EXT command issued by operating system 205. Serial ATA drive 265 may be configured to perform theses tasks in a manner consistent with NCQ protocol requirements, requiring no hardware changes in computer system 200, including Serial ATA drive 265.

Figure 3:
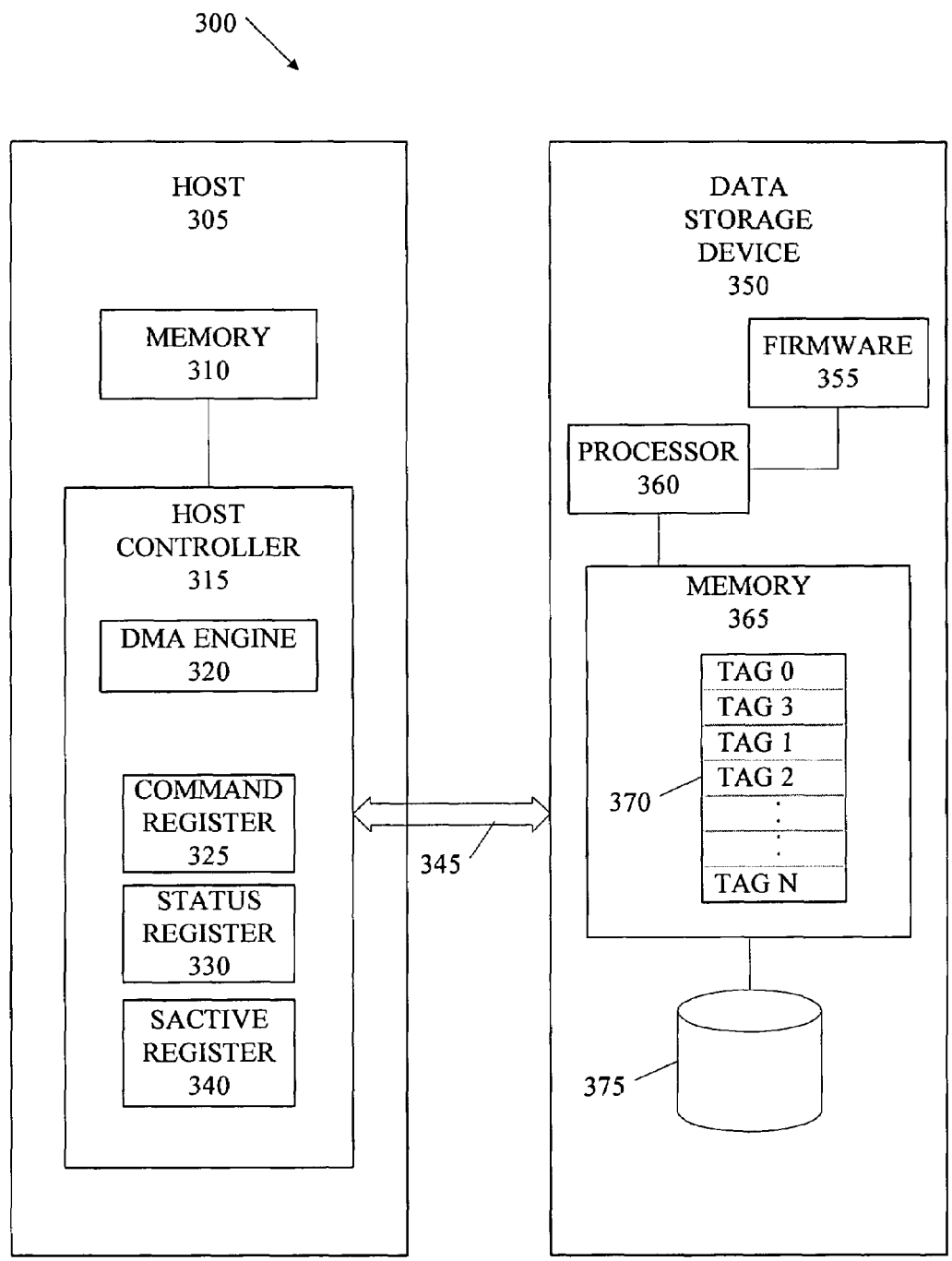
FIG. 3 shows a system having a host coupled to a data storage device having a command queue, a processor, firmware, and storage medium.

We turn now to FIG. 3. FIG. 3 illustrates how a storage device may receive a queue of commands, start processing the queue of commands, receive a non-queued command prior to processing all of the commands in the queue, and indicate whether a non-queued command has been successfully completed or not. FIG. 3 depicts a system 300 having a host 305 coupled to a data storage device 350. Host 305 may comprise memory 310 coupled to a host controller 315. Host 305 may utilize host controller 315 to write and read information to and from data storage device 350 via a serial link 345. The information may include data, such as data stored in storage medium 375, as well as commands and status information associated with processing those commands.

Both host 305 and data storage device 350 may support native command queuing. In other words, host 305 may use command register 325 to send numerous Read FPDMA Queued and Write FPDMA Queued commands to data storage device 350 over serial link 345, whereupon data storage device 350 may store the commands in a command queue 370 within storage device memory 365. Before sending each of the queued commands, though, host 305 may first verify that data storage device 350 is not already busy and is ready to accept a command for processing. Host 305 may verify that data storage device 350 is not busy by verifying that a BSY bit in a status register 330 located in host controller 315 is set to zero. After verifying the BSY bit is set to zero, but before sending individual native queued commands, host controller 315 may set individual bits of host controller SActive register 340, wherein the individual bits correspond to tag values for respective queue commands.

Figure 4A:
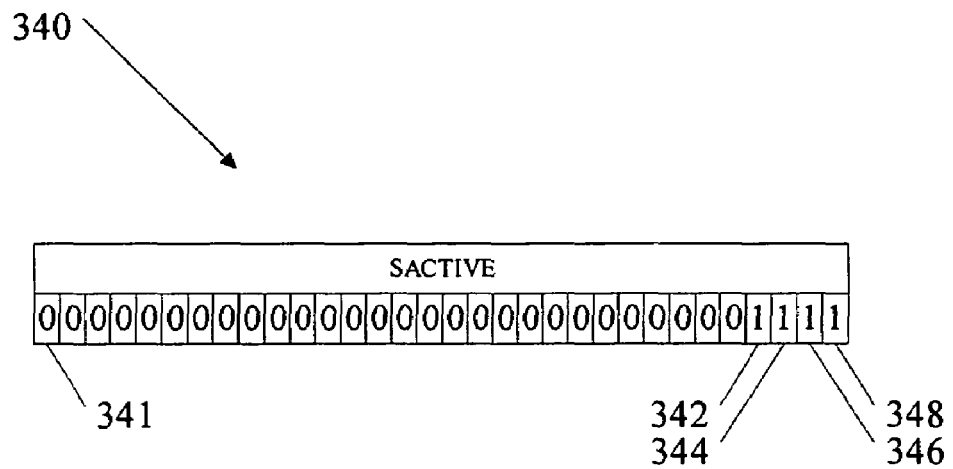
FIGS. 4A-B show an example SActive register and a Set Device Bits FIS.

As shown in more detail in FIG. 4A, SActive register 340 may comprise a 32-bit register. Host 305, working in conjunction with host controller 315, may set the individual bits of SActive register 340 by performing write operations to update SActive register 340. For example, bits 348, 346, 344, and 342 may correspond to tags 0, 1, 2, and 3, respectively, for queued commands that have been issued to data storage device 350, stored in command queue 370, and which remain uncompleted. Data storage device 350 processor 360 may have evaluated the individual commands stored in command queue 370, rearranged their order for execution efficiency, and be in the process of executing them. As depicted in FIG. 3, for example, processor 360 may have determined that an optimal execution order for the commands is command 0, command 3, command 1, and finally command 2.

Figure 4B:
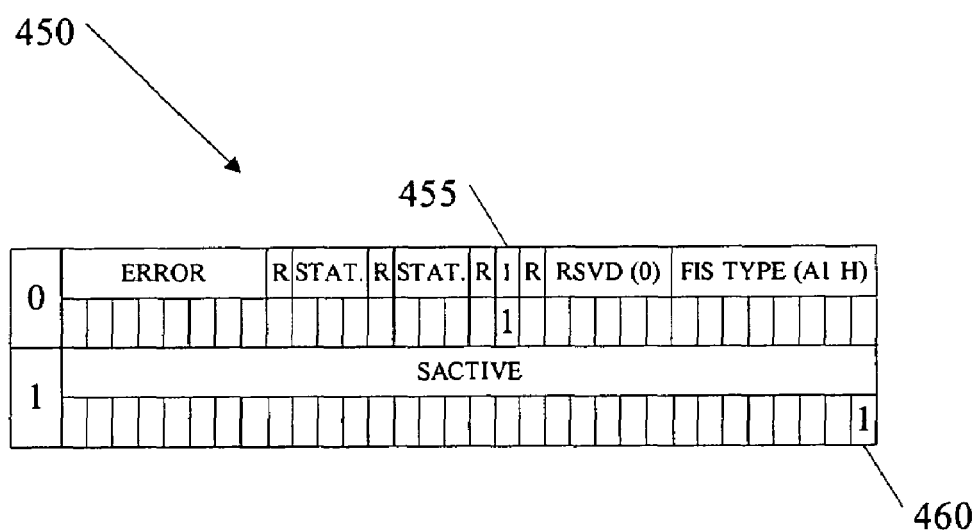

Data storage device 350 may proceed with processing command 0, which may be for example a Read DMA Queued command, by issuing a DMA Setup FIS for tag 0 to host controller 315. Host controller 315 may respond by loading the Physical Region Descriptor (PRD) pointer corresponding to tag 0 into DMA engine 320. Data storage device 350 may then send a Data FIS, potentially several Data FISes, corresponding to tag 0. Host controller 315 DMA engine 320 may direct the incoming data sent from data storage device 350 into a host memory region of memory 310 corresponding to the command with tag 0. To complete the command 0 execution, data storage device 350 may then send a Set Device Bits FIS to host controller 315. As depicted in FIG. 4B, Set Device Bits FIS 450 with "I" interrupt bit 455 and SActive register bit 460 for tag 0 set to 1 may indicate to host controller 315 that the command associated with tag 0 is complete. SActive register 340 bit 348 may be consequently cleared in host controller 315 and an interrupt may be triggered.

Data storage device 350 may then proceed with executing the queued command associated with tag 3. At this point host 305 may need to issue a non-queued command that needs to be processed immediately, before the remaining queued commands. In other words, host 305 may need to issue a command other than Read FPDMA Queued or Write FPDMA Queued. Since NCQ may not normally support such commands while queued commands are outstanding, the non-queued command may be erred when transmitted to data storage device 350, causing data storage device 350 to halt processing the queued commands. That is to say, to conform to the NCQ protocol, data storage device 350 must report an error after receiving a non-queued command when a queued command is outstanding. However, firmware 355 in data storage device 350 may be configured to respond even further in an unconventional way, causing data storage device 350 to execute the non-queued command, and yet provide information to host 305 concerning completion of the non-queued command in response to a READ LOG request such that host 305 may continue operating after taking appropriate actions.

Host 305 may place the non-queued command in command register 325 and issue the command to data storage device 350. Upon receiving the non-queued command, data storage device 350 may respond with error, per protocol. More specifically, data storage device 350 may signal the error condition to host 305 by transmitting a Register FIS to host 305 with the ERR and ABRT bits set to one, clear the BSY bit to zero in the status field of the FIS, and halt queued command processing. Data storage device 350 may also attempt to execute the non-queued command.

Figure 5:
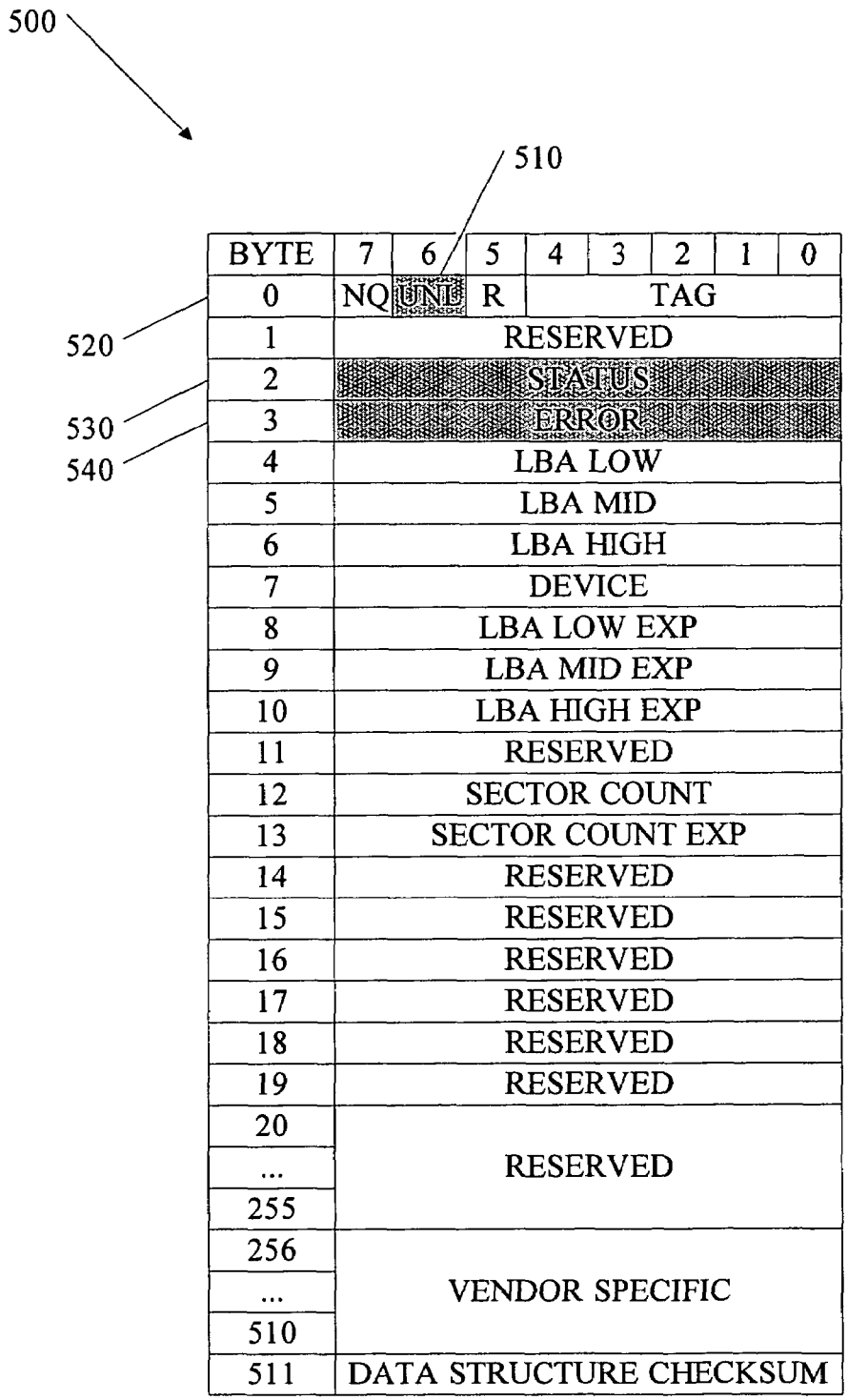
FIG. 5 shows an example Error Log Page that a device may transmit to a host.

Host 305, in response to receiving the error indication, may issue a READ LOG EXT command to data storage device 350. In responding to the READ LOG EXT command, or similar retrieve command, data storage device 350 may transmit an error log like the one shown in FIG. 5. As depicted in FIG. 5, error log page 500 shows that byte 520 may contain a single UNL bit 510 which may be set to one to indicate that the error condition was a result of receiving an "IDLE IMMEDIATE" command with the UNLOAD feature specified. If cleared to zero, the reason for the error may not be due to reception of an IDLE IMMEDIATE command with the UNLOAD feature specified. When set to one, however, the value of the Status field 530 and the Error field 540 in error log page 500 may indicate whether the unload was successful, still in progress, or unsuccessful. Completing the unload operation may take, for example, 100 milliseconds to complete. Due to this time for completion, data storage device 350 may still be executing it when host 305 issues the READ LOG EXT command. For indication of success in this case, host 305 may again issue the unload command. Since there may be no queue at this point, data storage device 350 may only indicate success upon completing or finishing the command, assuming there is no error while processing the command.

By having data storage device 350 report error information in this manner, host 305 may determine that the issued non-queued command was actually completed or in the process of being completed. Since all queued commands may have been flushed after receiving the command, host 305 may reissue the commands that were not processed so that data storage device 350 may finish processing them after the drop condition or other emergency condition has been addressed. As mentioned, this method of responding to a mix of queued and non-queued commands may have the advantage of only requiring software or firmware changes. An embodiment of a system 300 configured in the aforementioned manner may provide a consistent hardware architecture for both host 305 and data storage device 350. Additionally, such a configuration may allow higher level software within host 305 to issue the non-queued command to data storage device 350 regardless of whether a queued command is outstanding not.

Figure 6:
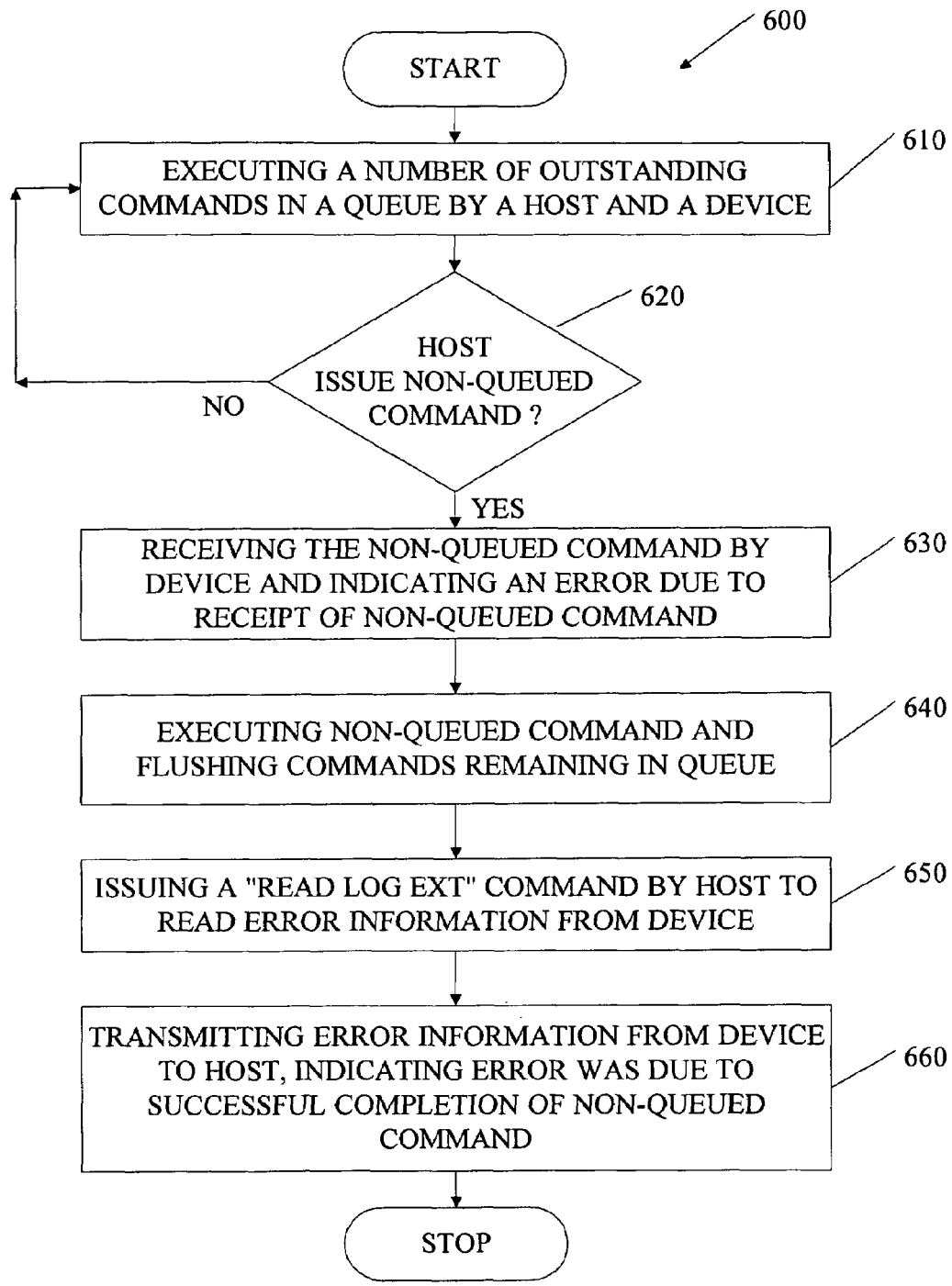
FIG. 6 depicts a flowchart of an embodiment of a system, wherein a host and a device are processing queued commands.

FIG. 6 depicts a flowchart 600 of an embodiment of a computer system, such as the computer system in FIG. 2, wherein a host and a device are processing queued commands. Flow chart 600 begins with executing a number of outstanding commands in a queue by the host and the device (element 610). For example, the host and device may process queued commands using Tagged Command Queuing, Native Command Queuing, or another queuing method. The host may then issue a non-queued command, such that the command is not in the format of being queued and may require immediate processing (element 620).

After issuing the non-queued command by the host, the device may receive the command and indicate an error in response to receiving the non-queued command (element 630). In some embodiments, the device may indicate the error after a short delay. The device may then execute the non-queued command and flush any commands that may have been in the queue (element 640). After receiving the error notification from the device, the host may then transmit or issue another command back to the device, requesting more information about the error (650). For example, the command that the host issues to the device may be a "Read Log" command.

Once the device receives the new command from the host, requesting more information about the error, the device may transmit error information to the host indicating that the error was due to successfully completing the non-queued command (element 660). As a result, the host may receive the error information and conclude that the device is operating properly. The host may then proceed operating normally, or the host may take some type of action in response to the error information. For example, the device may have cleared the command queue when executing the non-queued command. In this case, the host may then reissue the outstanding commands so that the device may execute them after the abnormal condition has passed.

Figure 7:
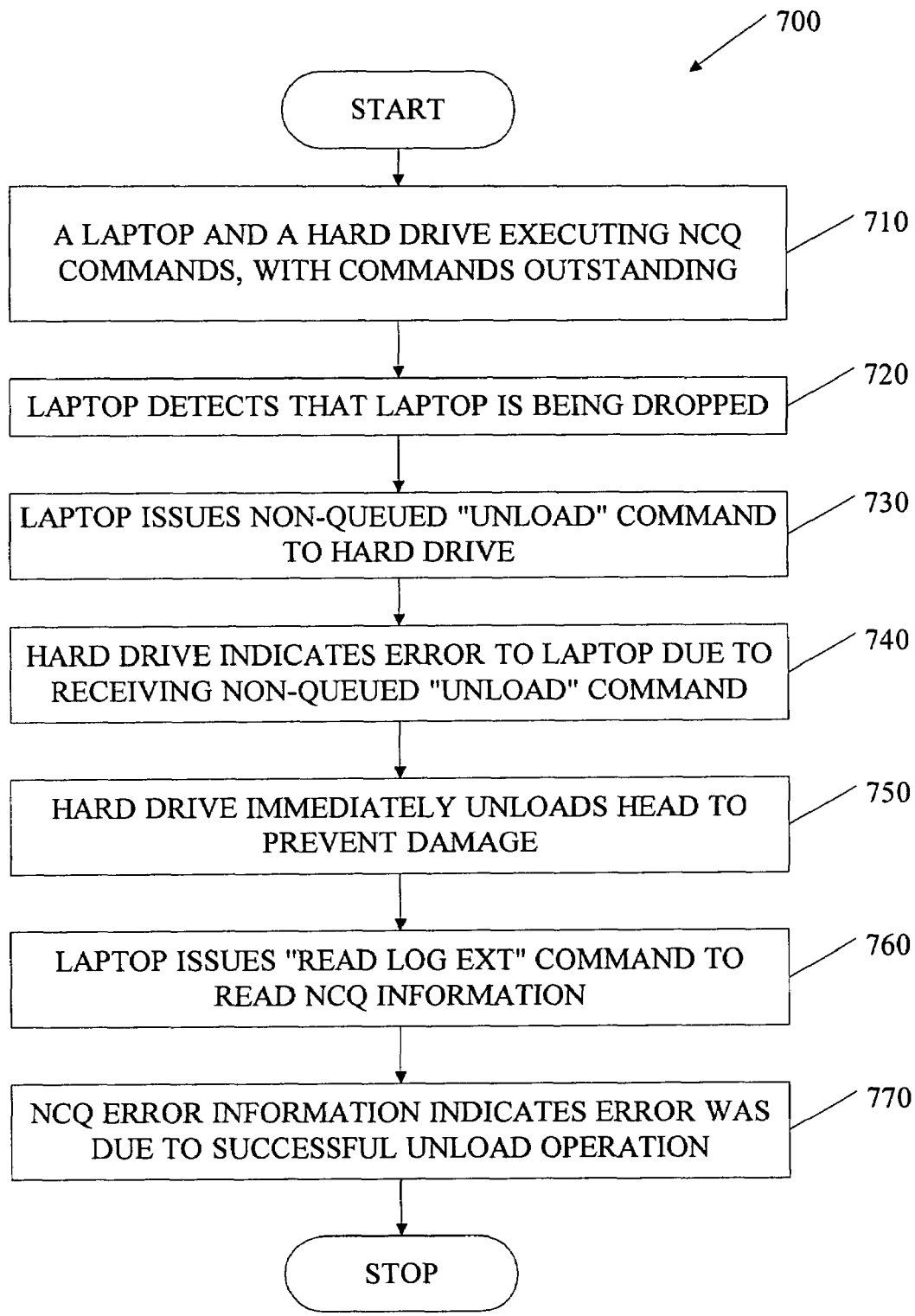
FIG. 7 depicts a flowchart of an embodiment of a laptop interfacing with a hard drive, illustrating how the hard drive may respond to a non-queued command.

FIG. 7 depicts a flowchart 700 of an embodiment of a laptop, such as the computer system of FIG. 2, interacting with a hard drive. In some embodiments, the hard drive may be a Serial ATA hard drive, while in other embodiments it may instead be a DVD drive or some other drive coupled to a Parallel ATA connecter of a computer system. Flowchart 700 begins with the laptop and the hard drive executing Native Command Queuing commands (element 710). At a point in time when some commands are outstanding, that is they have not been completed by the hard drive, the laptop may detect that the laptop is being dropped (elements 710 and 720). After detecting that the laptop is being dropped, the laptop may issue an "unload" command to the hard drive (element 730). In different embodiments, the "unload" command may vary. For example, in some embodiments, the unload command may comprise an "idle immediate with unload" command. In other embodiments, the unload command may comprise a "park heads" command.

In response to receiving the unload command, the hard drive may report an error since the unload command is a non-queued command (element 740). Responding with an error in this manner may ensure that any hardware acceleration or automation for NCQ protocol processing is not compromised. The hard drive may also unload or park the heads to protect the drive elements (element 750). Upon the laptop receiving the error command from the hard drive, the laptop may issue a command to read the error log associated with the error (element 760). The hard drive may respond to this read error log command by indicating that the NCQ error was due to a successfully completed, or still in progress, unload operation (element 770). Processing and responding to a non-queued unload command in this manner, while the hard drive is in the process of executing a queue of commands, may allow all externally visible behavior to the hard drive to remain the same, except for the error log.

Another embodiment of the invention is implemented as a program product for use with a system to perform processes, such as the processes described in conjunction with computer system 200 as illustrated in FIG 2. The program(s) of the program product defines functions of the embodiments (including the methods described herein) and can be contained on a variety of data media. Illustrative data media include, but are not limited to: (i) information permanently stored on non-writable storage media (e.g., read-only memory devices within a computer such as CD-ROM disks readable by a CD-ROM drive); and (ii) alterable information stored on writable storage media (e.g., floppy disks within a diskette drive or hard-disk drive). Such data media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by a computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods and arrangements for handling non-queued commands for data storage devices. It is understood that the form of the invention shown and described in the detailed description and the drawings are to be taken merely as examples. It is intended that the following claims be interpreted broadly to embrace all the variations of the embodiments disclosed.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method, comprising:
   detecting a condition by a host that causes the host to issue an idle immediate command to a data storage device;
   receiving the idle immediate command by the data storage device while a queue command is outstanding in a queue in which execution of commands can be reordered, wherein the queue command comprises a native command queuing (NCQ) command, wherein further receiving the idle immediate command comprises receiving an unload command;
   aborting execution of the queue command in response to receiving the idle immediate command;
   attempting execution of the idle immediate command, wherein attempting execution of the idle immediate command comprises unloading a head of the data storage device to prevent damage;
   setting an error bit to indicate whether the attempted execution of the idle immediate command is successful; and
   reissuing the queue command to the data storage device after executing the idle immediate command.

2. The method of claim 1, wherein detecting a condition comprises sensing that the host is being dropped.

3. The method of claim 1, wherein detecting a condition comprises sensing that the host is losing power.

4. The method of claim 1, further comprising flushing the queue command from the queue.

5. The method of claim 1, further comprising executing the reissued queue command.

6. The method of claim 1, further comprising issuing a retrieve command to the data storage device to retrieve error information related to setting the error bit.

7. The method of claim 1, further comprising indicating error information by the data storage device, wherein the error information pertains to the attempted execution of the idle immediate command.

8. The method of claim 7, wherein indicating error information comprises setting a data bit of a log page.

9. The method of claim 1, further comprising setting an initial error bit by the data storage device in response to receiving the idle immediate command while the queue command is outstanding.

10. The method of claim 1, wherein receiving an idle immediate command comprises receiving a flush command to place any volatile content in temporary storage onto a non-volatile storage medium of the data storage device.

11. A data storage device comprising:
    a memory device;
    a head;
    a command processor coupled with the memory device and the head, wherein the command processor is configured to:
       receive a first command while a second command is outstanding in a queue,
          wherein an execution sequence of commands in the queue may be altered,
          wherein further the first command comprises an idle immediate command with an unload feature specified,
          wherein further a host of the data storage device issues the idle immediate command in response to detecting a condition of the data storage device,
          wherein further the second command is a native command queuing (NCQ) command,
       abort execution of the second command,
       attempt execution of the first command, wherein execution of the first command comprises unloading the head to prevent damage;
       set an error bit in to indicate whether the attempted execution of the first command is successful; and
       receive the second command after execution of the first command.

12. The data storage device of claim 11, wherein the head is coupled to the command processor via an actuator arm, wherein the actuator arm and the head are used to store data in a storage medium.

13. The data storage device of claim 12, further comprising an actuator coupled to the actuator arm, wherein the actuator is used to move the actuator arm and the head to a parking bay in the data storage device.

14. The data storage device of claim 12, wherein the storage medium comprises a circular platter coupled to a spindle, wherein the platter comprises a rigid magnetic media.

15. The data storage device of claim 11, wherein the data storage device comprises a serial ATA hard drive.

16. The data storage device of claim 11, wherein the data storage device comprises a parallel ATA hard drive.

17. The data storage device of claim 11, wherein the data storage device comprises an optical storage device.

18. A system comprising:
    a host comprising DRAM;
    a sensor coupled to the host, wherein the host is configured to issue an idle immediate command with unload feature specified when the sensor senses the host being dropped; and
    a storage device coupled to the host, wherein the storage device comprises:

a processor configured to execute a queue command of a native command queuing (NCQ) queue in which execution of commands can be reordered, to receive the idle immediate command while the queue command is outstanding, to abort execution of the queue command, to attempt execution of the idle immediate command, to set an error bit to indicate whether the attempted execution of the idle immediate command is successful, and to attempt execution of the queue command upon reissuance of the queue command after the attempted execution of the idle immediate command.

19. The system of claim 18, wherein the host comprises a portable computing device.

20. The system of claim 18, wherein the host comprises a workstation computing device.

21. The system of claim 18, wherein the storage device comprises a hard drive in a RAID array.

22. A machine-accessible tangible medium containing instructions, which when executed by a host, cause the host to perform operations, the operations comprising:

issuing an unload command to a data storage to protect the data storage device when the data storage device is dropped;

requesting error information from a data storage device in response to an error condition of the data storage device, wherein the error condition is created in response to the data storage device attempting execution of the unload command while a queue command in a native command queuing (NCQ) queue of alterable execution sequence remains outstanding;

receiving the error information from the data storage device, wherein the error information indicates whether the attempted execution of the unload command is successful; and reissuing the queue command upon successful execution of the unload command.

* * * * *